(12) United States Patent  
Xie et al.

(10) Patent No.: US 12,373,209 B1  
(45) Date of Patent: Jul. 29, 2025

(54) VECTOR DATASET INDEX PARAMETER DETERMINATION

(71) Applicant: ZILLIZ INC., Redwood City, CA (US)

(72) Inventors: Chao Xie, Redwood City, CA (US); Min Tian, Shanghai (CN); Li Liu, Redwood City, CA (US); Chao Gao, Shanghai (CN)

(73) Assignee: ZILLIZ INC., Redwood City, CA (US)

( * ) Notice: Subject to any disclaimer, the term of this patent is extended or adjusted under 35 U.S.C. 154(b) by 3 days.

(21) Appl. No.: 18/426,509

(22) Filed: Jan. 30, 2024

(51) Int. Cl.
  *G06F 16/22* (2019.01)
  *G06F 9/30* (2018.01)
  *G06F 9/345* (2018.01)
  *G06F 16/2458* (2019.01)

(52) U.S. Cl.
  CPC .......... *G06F 9/30036* (2013.01); *G06F 9/345* (2013.01); *G06F 16/2237* (2019.01); *G06F 16/2462* (2019.01)

(58) Field of Classification Search
  CPC .. G06F 9/30036; G06F 9/345; G06F 16/2237; G06F 16/2462
  USPC ........................................................ 707/736
  See application file for complete search history.

(56) References Cited

U.S. PATENT DOCUMENTS

| 6,134,541 | A  | * | 10/2000 | Castelli | ............. | G06F 18/24137 |
| 2014/0016863 | A1 | * | 1/2014 | Saxena | ................... | G06V 10/56 |
|  |  |  |  |  |  | 707/723 |
| 2015/0213463 | A1 | * | 7/2015 | Turner | ................ | G06F 16/2455 |
|  |  |  |  |  |  | 705/7.29 |
| 2018/0068023 | A1 | * | 3/2018 | Douze | ................. | G06F 16/9535 |

OTHER PUBLICATIONS

"Approximate nearest neighbor search device, approximate neartest neighbor search method, and program". Iwamura et. al. Sep. 6, 2021. WO2013129580 (Year: 2013).*

* cited by examiner

*Primary Examiner* — Michael Pham
(74) *Attorney, Agent, or Firm* — HAUPTMAN HAM, LLP

(57) ABSTRACT

Vector dataset index parameter determination is performed by building an index of a vector dataset according to each build parameter group among a plurality of build parameter groups, generating search parameter groups, submitting each vector query in a vector query set to each index according to the candidate search parameter values from each search parameter group to obtain, for each submission, a result content and a result delay value, obtaining, for each submission, a vector distance between at least one result vector of the result content and the submitted vector query, determining a relative accuracy value for each submission by comparing the vector distance of the result content to the vector distance of at least one other submission, correlating build parameter values and search parameter values with the relative accuracy values and the result delay values, and fixing build parameter values based on the correlating.

20 Claims, 10 Drawing Sheets

VECTOR DATASET INDEX PARAMETER DETERMINATION

BACKGROUND

Approximate Nearest Neighbor Search (ANNS) of a vector database or a vector engine is used widely in information retrieval, machine learning, and data mining. These applications convert the data into feature vectors and store them in the database with ANNS indexes. The search target will be converted into a vector to search for similar vectors in the database. Using an ANNS index, results of a query of the vector database will be returned with decreased accuracy, but also decreased delay compared with non-indexed vector databases. Common ANNS algorithms include In Verted File (IVF), InVerted File Product Quantization (IVFPQ), Hierarchical Navigable Small World (HNSW), Disk Approximate Nearest Neighbor (DiskANN), etc.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
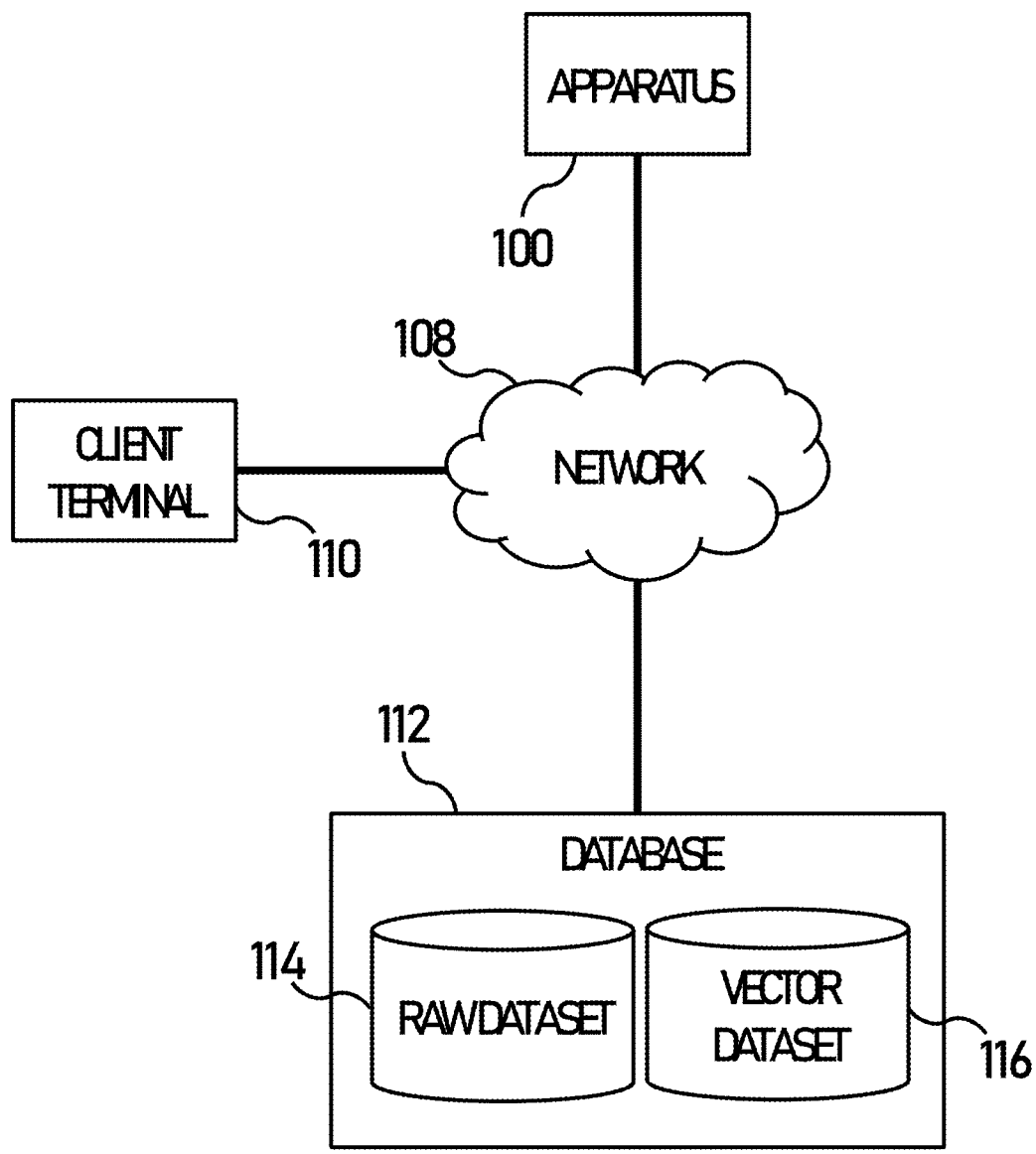
FIG. 1 is a block diagram of a system for vector dataset index parameter determination, according to at least some embodiments of the subject disclosure.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Users use vector databases for vector similarity searches. They mainly concern with how to search with high precision (or high recall) with low response time in their scenarios, that is, how to trade off accuracy and response time. To meet their needs (high precision or low response time), users need to have the ANNS index background and pay a large amount of trial-and-error cost. On the one hand, they must understand all ANNS indexes in the vector database and the various parameters' roles in different indices. On the other hand, given the user's data attributes (dimension, data size, data distribution, etc.) and physical resources, they must pick the most suitable indexes and parameters, which usually means a bunch of tests. All of those are too hard for users.

In general, parameter optimization for vector database queries is a very common and important task. However, in some actual production environments, users lack ground truth, and the time cost of generating ground truth is extremely high. As a result of such conditions, parameter optimization is a difficult task, and the parameters are often selected manually by experienced engineers. On the one hand, manual selection of parameters relies on the skill and experience of engineers, which requires an in-depth knowledge of indexing algorithms for vector search. With the diversity of technologies and rapid development iterations, engineers can hardly master the experience of tuning parameters in a short period of time. On the other hand, the performance (query time and precision) is influenced by the actual vector data distribution. Different vector collections, even with the same environment and the same parameters, have inconsistent performance. Even an experienced engineer can only extrapolate from the performance under most data sets and cannot guarantee a perfect match with the current vector data set.

At least some embodiments of the subject disclosure include a parameter optimization method for vector database query. At least some embodiments include methods for evaluating the precision of the search results in an unsupervised scenario lacking ground truth. At least some embodiments include methods for automatically selecting a suitable index according to variable criteria, such as the user's needs, data attributes, physical resources, etc. At least some embodiments adapt parameters for each search request according to desired accuracy, number of results, delay, etc.

FIG. 1 is a block diagram of a system for vector dataset index parameter determination, according to at least some embodiments of the subject disclosure. The system includes an apparatus 100, a client terminal 110, and a database 112 in communication through a network 108.

In at least some embodiments, apparatus 100 is configured for vector dataset index parameter determination. In at least some embodiments, apparatus 100 includes a non-transitory computer-readable medium including instructions executable by a processor to cause the processor to perform vector dataset index parameter determination. In at least some embodiments, apparatus 100 is a single server, a plurality of servers, a portion of a server, a virtual instance of cloud computing, etc.

Database 112 includes a raw dataset 114 and a vector dataset 116. In at least some embodiments, a user may submit a query request by completing a query form provided in client terminal 110, and transmitting the query form to database 112 through network 108. In at least some embodiments, raw dataset 114 includes instances of the actual data desired in a query, such as instances of image data, instances of video data, instances of audio data, or instances of other data. In at least some embodiments, vector dataset 116 includes data that merely labels the raw data. In at least some embodiments, each vector among vector dataset 116 labels an instance of raw data among raw dataset 114.

In at least some embodiments, client terminal 110 includes a non-transitory computer-readable medium including instructions executable by a processor to cause the processor to submit queries to database 112. In at least some embodiments, client terminal 110 is a device having limited computation resources, such as a smart watch, a fitness tracker, an Internet-of-Things (IoT) device, etc., or a device having computational resources for a broader range of capabilities, such as a smart phone, a tablet, a personal computer, etc.

In at least some embodiments, network 108 is configured to relay communication among apparatus 100, client terminal 110, and database 112. In at least some embodiments, network 108 is a local area network (LAN), a wide area network (WAN), such as the internet, a radio access network (RAN), or any combination. In at least some embodiments, network 108 is a packet-switched network operating according to IPv4, IPv6 or other network protocol.

Figure 2:
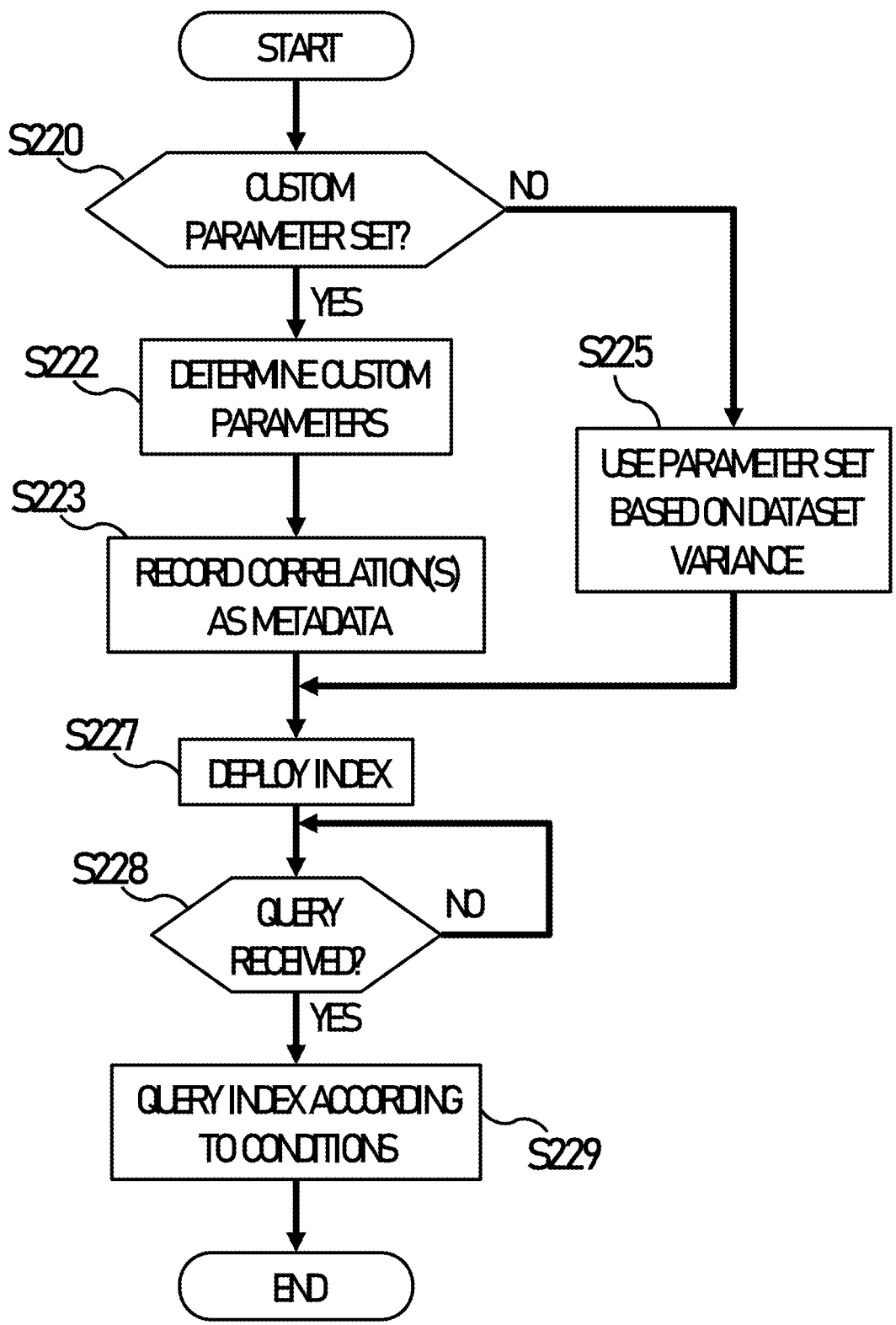
FIG. 2 is an operational flow for vector dataset index creation and utilization, according to at least some embodiments of the subject disclosure.

FIG. 2 is an operational flow for vector dataset index creation and utilization, according to at least some embodiments of the subject disclosure. The operational flow provides a method of vector dataset index creation and utilization. In at least some embodiments, one or more operations of the method are executed by a controller of an apparatus, such as the controller and the apparatus shown in FIG. 10, which will be explained hereinafter.

At S220, the controller or a section thereof determines whether to provide a custom parameter set. In response to the controller determining to provide a custom parameter set, the operational flow proceeds to custom parameter determination at S222. In response to the controller determining not to provide a custom parameter set, the operational flow proceeds to parameter set usage at S225.

At S222, the controller or a section thereof determines custom parameters. In at least some embodiments, the controller determines custom parameters according to variable criteria, such as the user's needs, data attributes, physical resources, etc. In at least some embodiments, data attributes include dimension, data size, data distribution, number of vectors, etc. In at least some embodiments, the controller performs the operations shown in FIG. 3, which will be explained hereinafter.

At S223, the controller or a section thereof records correlation(s) as metadata. In at least some embodiments, a correlating section correlates build parameter values and search parameter values with accuracy values and result delay values. In at least some embodiments, the controller records a mathematical relationship expressing a correlation of search depth parameter, number of requested results, and accuracy as metadata for future queries of the database. In some embodiments, the mathematical relationship exists in the metadata information in the form of configuration. In at least some embodiments, the mathematical relationship is expressed as a mathematical formula. In at least some embodiments, the mathematical relationship is expressed as a look-up table.

At S225, the controller or a section thereof uses a parameter set based on dataset variance. In at least some embodiments, the controller determines the build parameters according to the distribution of the vector dataset. In at least some embodiments, the controller determines the build parameters according to the local intrinsic dimension of the vector dataset, the local intrinsic dimension being a single value representative of the distribution of the vector dataset. In at least some embodiments, the controller uses the same build parameters for vector datasets with a similar distribution, and those build parameters allow the datasets to use similar search parameters to achieve similar accuracy. In at least some embodiments, the controller adjusts resource-related search parameters by the available physical resources of the database hosting the vector dataset, such as database 112 of FIG. 1, including a number of CPUs, a memory capacity, an I/O bandwidth, etc., and determines parameters based on number of requested results and accuracy level. In at least some embodiments, a dynamic adjustment method is adopted by the controller to match different numbers of requested results and accuracy levels.

At S227, the controller or a section thereof deploys the index for the vector dataset. In at least some embodiments, the controller deploys the index for the vector dataset built according to fixed build parameter values. In at least some embodiments, build parameter values are fixed as a result of custom parameter determination at S222 based on the build parameter values and search parameter values correlated with accuracy values and result delay values. In at least some embodiments, the controller deploys the index for the vector dataset built from parameters determined according to the distribution of the dataset at S225.

At S228, the controller or a section thereof determines whether a query is received. In at least some embodiments, the controller determines if the database receives a query from the client terminal. In response to the controller determining that a query is received, the operational flow proceeds to index querying at S229. In response to the controller determining that a query is not received, the operational flow repeats the process of determining if a query is received at S228.

At S229, the controller or a section thereof queries the index according to conditions. In at least some embodiments, the controller queries the index according to a desired accuracy level and number of results. In at least some embodiments, the controller reads a configuration file adapted to the vector dataset, and utilizes the configuration file to determine one or more search parameters for the query in response to receiving the query. In at least some embodiments, the controller performs the operations shown in FIG. 6, which will be explained hereinafter.

In at least some embodiments, index deploying at S227, query receiving at S228, and index querying at S229 are performed by the database hosting the index of the vector data set, such as database 112 of FIG. 1.

Figure 3:
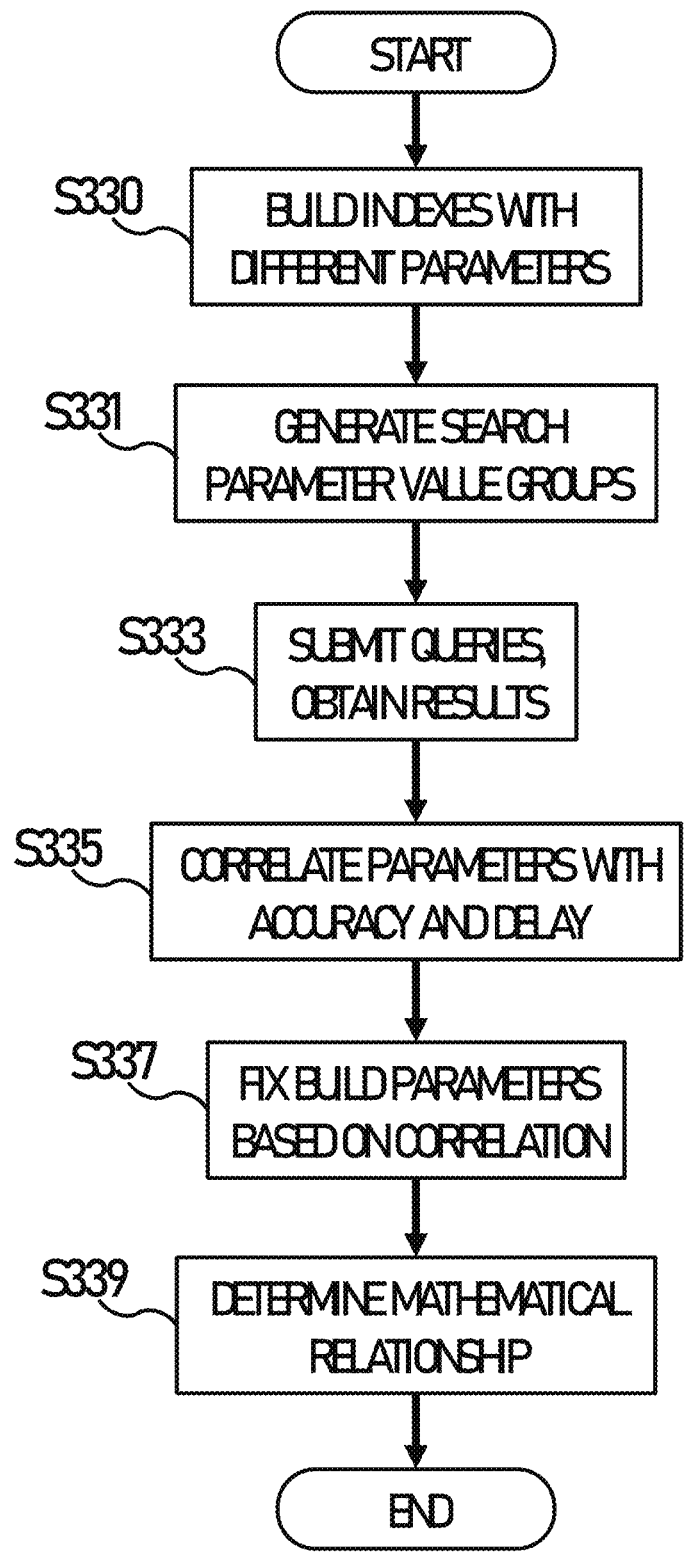
FIG. 3 is an operational flow for vector dataset index parameter determination, according to at least some embodiments of the subject disclosure.

FIG. 3 is an operational flow for vector dataset index parameter determination, according to at least some embodiments of the subject disclosure. The operational flow provides a method of vector dataset index parameter determination. In at least some embodiments, one or more operations of the method are executed by a controller of an apparatus, such as the controller and the apparatus shown in FIG. 10, which will be explained hereinafter.

At S330, a building section of the controller builds indexes with different parameters. In at least some embodiments, the building section builds an index of a vector dataset according to each build parameter group among a plurality of build parameter groups, each build parameter group including a plurality of candidate build parameter values. In at least some embodiments, the building section builds each index of the same type. In at least some embodiments, the building section builds indexes of different types. In at least some embodiments, the building section builds HNSW indexes, each having a different value for the "M" parameter. In at least some embodiments, the building section builds IVF indexes, each having a different value for the "nlist" parameter. In at least some embodiments, the controller or a section thereof determines the plurality of candidate build parameter values of each build parameter group based on an index type. In at least some embodiments, the vector dataset is V, wherein $$V=[v_1, v_2, \ldots, v_n],$$

wherein each $v_k$ is a vector in the vector dataset, and n is the number of vectors in the vector dataset.

At S331, a generating section of the controller or a section thereof generates search parameter values. In at least some embodiments, the generating section generates search parameter groups, each search parameter group including a plurality of candidate search parameter values, wherein the plurality of candidate search parameter values includes a search depth parameter value and a number of requested results. In at least some embodiments, at least some search parameter groups relate to HNSW indexes, and the search depth parameter is the "ef_search" parameter. In at least some embodiments, at least some search parameter groups relate to IVF indexes, and the search depth parameter is the "nprobe" parameter. In at least some embodiments, the generating section generates an array of search depth parameter values sufficient to determine the relationship with accuracy level and number of requested results. In at least some embodiments, number of requested results is referred to as "topk" results, and accuracy is referred to as "recall". In at least some embodiments, a plurality of parameter groups is P, wherein $$P=[p_1, p_2, \ldots, p_l],$$

wherein each $p_k$ is a combination of a build parameter group and a search parameter group, and/is the number of parameter group combinations. In at least some embodiments, based on the vector dataset V, vector database test cases D are generated according to each parameter group $p_k$ of P, wherein $$D=[d_1, d_2, \ldots, d_l],$$

wherein each $d_k$ is a vector database test case, and/is the number of vector database test cases, which is consistent with the number of parameter group combinations.

At S333, a submitting section of the controller submits queries and obtains results. In at least some embodiments, the submitting section submits each vector query in a vector query set to each index according to the candidate search parameter values from each search parameter group to obtain, for each submission, a result content and a result delay value. In at least some embodiments, each vector query includes search terms, search parameters, a desired number of search results, and a desired accuracy. In at least some embodiments, a test vector query set Q is generated by sampling from the vector dataset V, wherein $$Q=[q_1, q_2, \ldots, q_m], \text{length}=m$$

wherein each $q_k$ is a vector query, and m is the number of vector queries. In at least some embodiments, the number of samples and the sampling method can be customized. In at least some embodiments, the controller performs the operations shown in FIG. 4, which will be explained hereinafter.

At S335, the controller or a section thereof correlates parameters with accuracy and delay. In at least some embodiments, the controller correlates build parameter values and search parameter values with relative accuracy values and result delay values. In at least some embodiments, build parameter values and search parameter values are correlated with delay values and accuracy values.

At S337, the controller or a section thereof fixes build parameters based on the correlation. In at least some embodiments, the controller fixes build parameter values based on the correlation of the build parameter values and search parameter values with the accuracy values and result delay values. In some embodiments, the build parameter values are fixed according to a balance between accuracy and delay.

At S339, the controller or a section thereof determines a mathematical relationship. In at least some embodiments, the controller determines a mathematical relationship expressing a correlation of the search depth parameter values, the numbers of requested results, and the accuracy values obtained in response to vector queries submitted to the index having the fixed build parameter values. In some embodiments, the mathematical relationship shows a relationship between search depth parameter, accuracy level, and number of requested results. In some embodiments, the mathematical relationship shows a relationship between search depth parameter and number of requested results for each of two or more accuracy levels. In at least some embodiments, the controller performs the operations shown in FIG. 5, which will be explained hereinafter.

Figure 4:
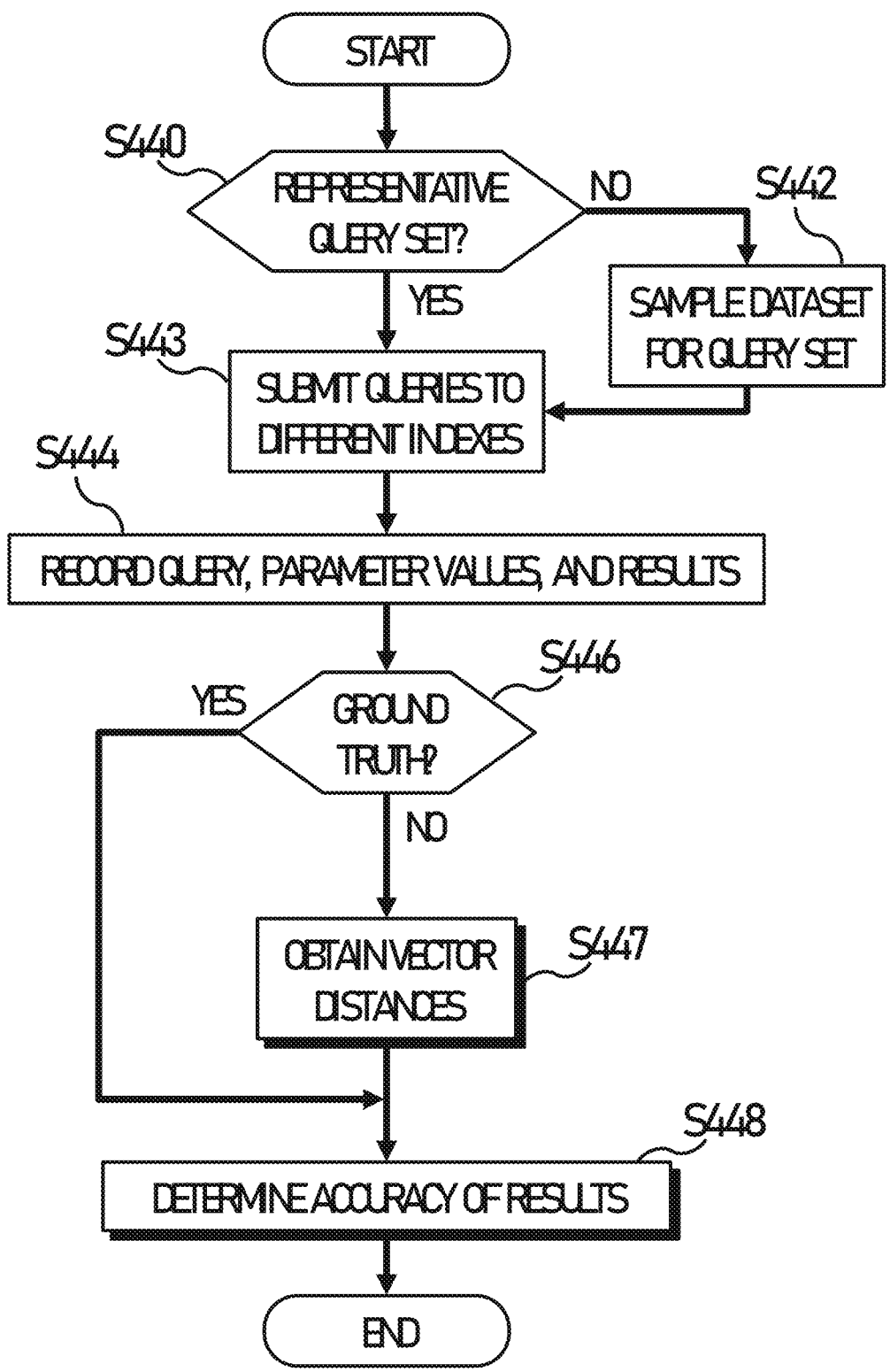
FIG. 4 is an operational flow for submitting queries and obtaining results, according to at least some embodiments of the subject disclosure.

FIG. 4 is an operational flow for submitting queries and obtaining results, according to at least some embodiments of the subject disclosure. The operational flow provides a method for submitting queries and obtaining results. In at least some embodiments, one or more operations of the method are executed by a controller of an apparatus, such as the controller and the apparatus shown in FIG. 10, which will be explained hereinafter.

At S440, the controller or a section thereof determines whether a representative query set is provided. In at least some embodiments, the index process is triggered automatically by the system or the user according to whether the provide a representative query is provided. In response to the controller determining that a representative query is provided, the operational flow proceeds to query submission at S442. In response to the controller determining that a representative query is not provided, the operational flow proceeds to dataset sampling at S443.

At S442, the generating section of the controller generates a sample dataset for a query set. In at least some embodiments, the generating section samples vectors among a vector dataset for use as the vector query set. In at least some embodiments, random vectors are selected from the vector dataset as the query set. In at least some embodiments, transformations are made to the randomly selected vectors so that the queries do not have an exact matching vector in the vector dataset.

At S443, the submitting section of the controller submits queries to different indexes. In at least some embodiments, the query performance of a representative query set in the real scenario, such as a representative query set provided by an administrator of the vector dataset, is more representative of the actual performance of the system service.

At S444, the controller or a section thereof records query, parameter values, and results. In at least some embodiments, the controller or the section thereof records, for each submission, the vector query and the search parameter values along with a result content and a result delay. In at least some embodiments, the controller records the information to local storage or remote storage. In at least some embodiments, the performance of each instance from the vector database test cases D is tested respectively by using all the test query vectors in Q. In at least some embodiments, the controller records the query time of test vector query $q_j$ on instance $d_i$ as time $time_{i\_j}$. In at least some embodiments, the controller records the searched nearest neighbor results of test vector query $q_j$ on instance $d_i$ as $res_{i\_j}$. In at least some embodiments, $res_{i\_j}$ consists of two parts, the identification numbers of the nearest neighbors resulting from the query in the whole vector database ids, and a distance from the test vector query corresponding to each identification number distances. In at least some embodiments, the determining section calculates the average query time with different test cases, wherein $$time_i = \sum\nolimits_{j}^{m} time_{i\_j}/m.$$

In at least some embodiments, submission of $\forall$query vector q, given a combination of parameter groups p, results in the "topk" nearest neighbor vectors res, which includes two parts:
  (1) the number of the nearest neighbors in the whole vector database:

$res\_ids=[id_1,id_2, \ldots ,id_k]$, wherein each $id_x$ is a vector identifier, which are sorted from near to far, and k is the number of vector identifiers; and
  (2) its distance to the test query vector $res\_distances=[dis_1,dis_2, \ldots ,dis_k]$,length=$k$,sort from small to large, wherein each $dis_x$ is a vector distance, which are sorted from small to large, and k is the number of vector distances.

At S446, the controller determines if ground truth is provided. In at least some embodiments, the accuracy of the result in vector retrieval is calculated based on ground truth. In at least some embodiments, an unsupervised tuning method is used if no ground truth is provided. In response to the controller determining that ground truth is provided, the operational flow proceeds to accuracy calculation at S448. In response to the controller determining that ground truth is not provided, the operational flow proceeds to threshold calculation and baseline selection at S447.

At S447, an obtaining section of the controller obtains vector distances. In at least some embodiments, the obtaining section obtains, for each submission, a vector distance between at least one result vector of the result content and the submitted vector query. In at least some embodiments, an unsupervised tuning method is carried out, in response to no representative query being provided. In at least some embodiments, the controller performs the operations shown in FIG. 8, which will be explained hereinafter.

At S448, the determining section of the controller determines accuracy of results. In at least some embodiments, the determining section determines the accuracy value based on ground truth. In at least some embodiments, the determining section determines a relative accuracy value for each submission by comparing the vector distance of the result content to the vector distance of at least one other submission. In at least some embodiments, the determining section calculates relative accuracy for each query result based on the estimated ground truth. In at least some embodiments, the determining section calculates the relative accuracy as a proportion of the number of results matching the ground truth or estimated ground truth. In at least some embodiments, the determining section calculates the accuracy for all searched nearest neighbor results by comparing with a baseline results $res_{baseline}$. In at least some embodiments, the determining section performs the operations shown in FIG. 9, which will be explained hereinafter.

Figure 5:
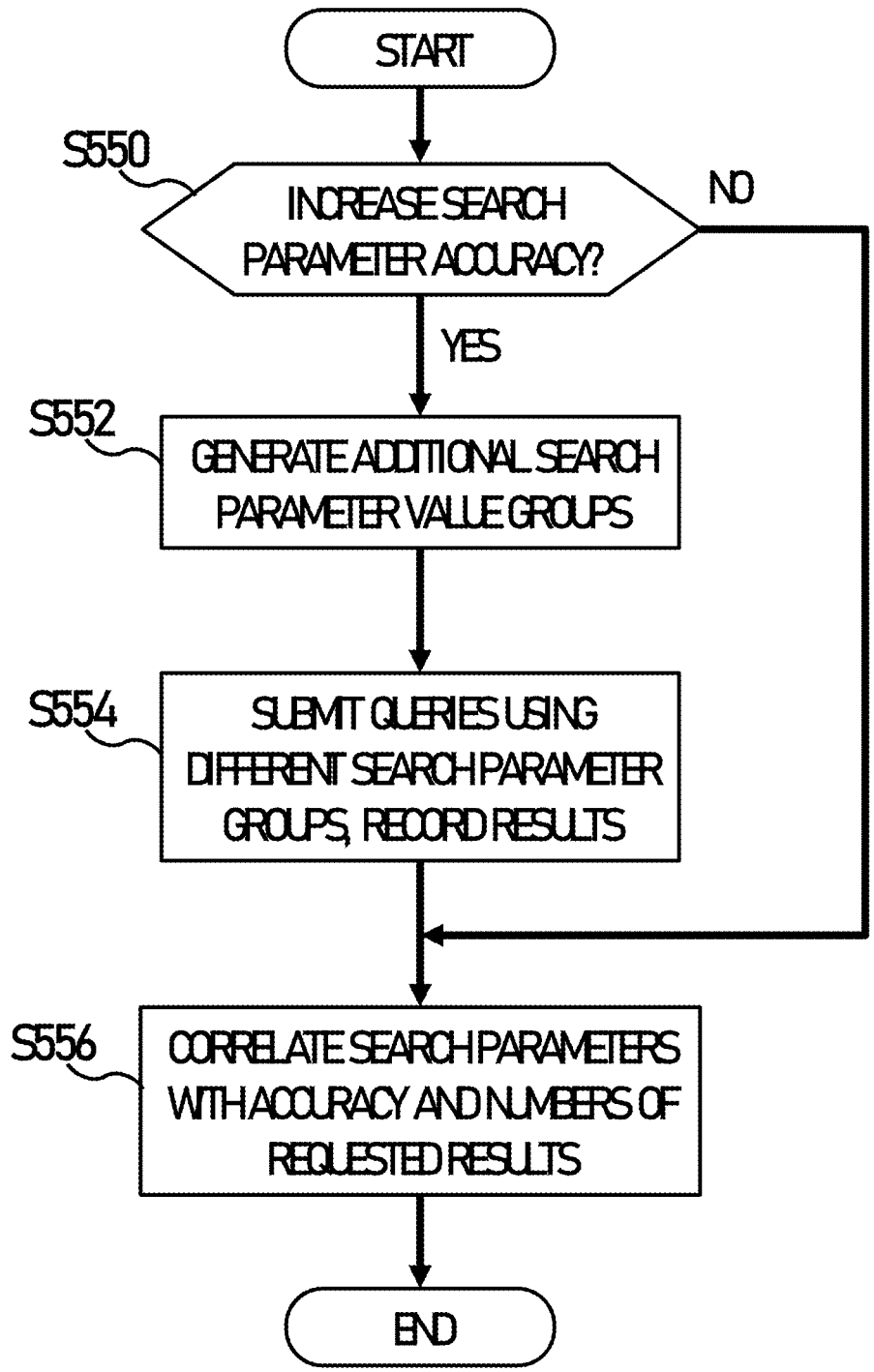
FIG. 5 is an operational flow for determining a mathematical relationship, according to at least some embodiments of the subject disclosure.

FIG. 5 is an operational flow for determining a mathematical relationship, according to at least some embodiments of the subject disclosure. The operational flow provides a method for determining a mathematical relationship. In at least some embodiments, one or more operations of the method are executed by a controller of an apparatus, such as the controller and the apparatus shown in FIG. 10, which will be explained hereinafter.

At S550, the controller or a section thereof determines whether to increase the search parameter accuracy. In at least some embodiments, the controller or a section thereof submits queries under various search parameter values, and receives query results under the various search parameter values. In at least some embodiments, an increase of the search parameter accuracy is needed when an accuracy of the query results needs to be improved. In response to the controller determining to increase the search parameter accuracy, the operational flow proceeds to additional search parameter value group generation at S552. In response to the controller determining not to increase the search parameter accuracy, the operational flow proceeds to correlation at S556.

At S552, the generating section of the controller generates additional search parameter value groups, in response to increase search parameter accuracy is needed. In at least some embodiments, the generating section generates, after the fixing of the build parameter values, additional search parameter groups based on the fixed build parameter values. In at least some embodiments, each additional search parameter group includes a plurality of candidate search parameter values, wherein the plurality of candidate search parameter values includes a search depth parameter value and a number of requested results.

At S554, the submitting section of the controller submits queries using different search parameter groups, and the controller records the results. In at least some embodiments, the controller or a section thereof is configured to execute one or more operations of the method, such as operations shown in FIG. 4, which is explained hereinabove.

At S556, the controller or a section thereof correlates search parameters with accuracy and numbers of requested results. In at least some embodiments, the controller correlates search parameter values with accuracy values and numbers of requested results. In at least some embodiments, the controller correlates search parameter values with specified result size and accuracy value. In at least some embodiments, the controller tries various search parameter values in the query submissions at S554 so that the relevant search parameter values to the query request may be found. In at least some embodiments, the mathematical relationship shows a relationship between search depth parameter and number of requested results for each of two or more accuracy levels.

Figure 6:
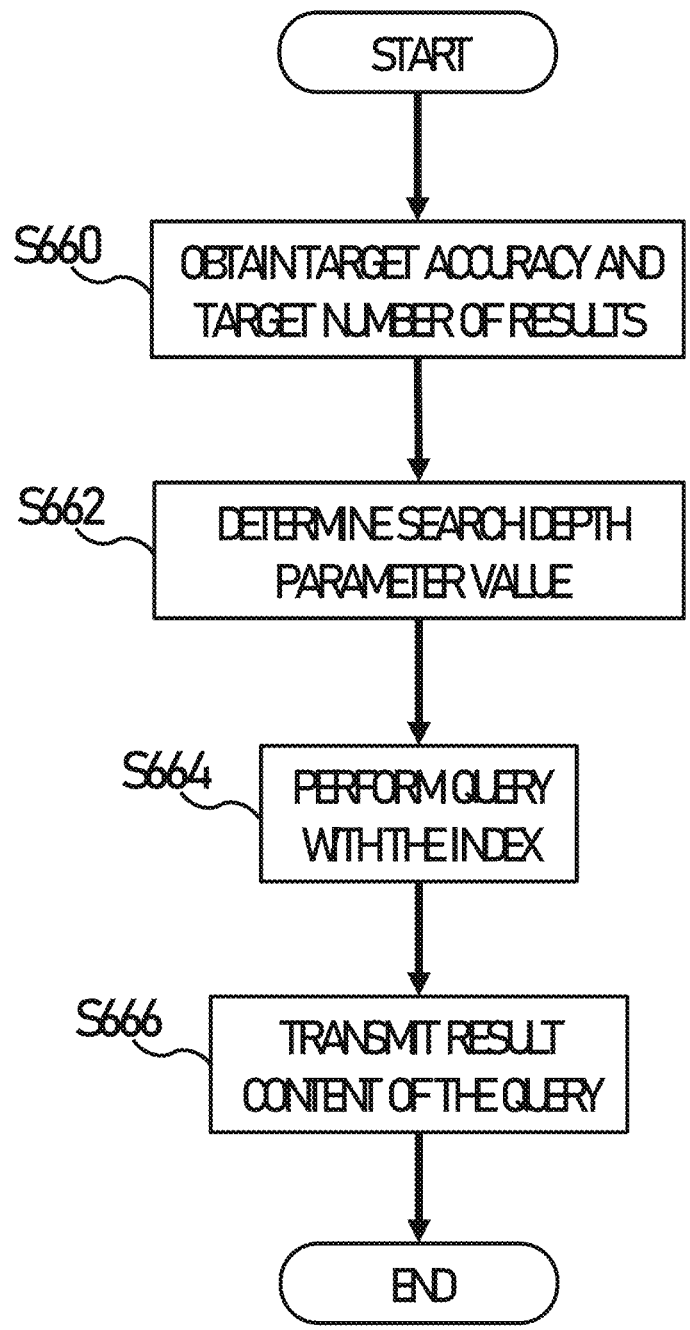
FIG. 6 is an operational flow for querying an index, according to at least some embodiments of the subject disclosure.

FIG. 6 is an operational flow for querying an index, according to at least some embodiments of the subject disclosure. The operational flow provides a method for querying an index. In at least some embodiments, one or more operations of the method are executed by a controller of an apparatus, such as the controller and the apparatus shown in FIG. 10, which will be explained hereinafter.

At S660, the controller or a section thereof obtains target accuracy and target number of results. In at least some embodiments, the controller receives a target accuracy and a target number of results for the query provided by the client terminal 110. In some embodiments, in response to receiving the query, the metadata information containing the mathematical relationship is extracted according to the accuracy levels and required "topk" results.

At S662, the controller determines a search depth parameter value. In at least some embodiments, the controller determines a search depth parameter value based on a target accuracy and a target number of results based on the mathematical relationship. In at least some embodiments, the mathematical relationship expresses a correlation of search depth parameter, number of requested results, and accuracy.

At S664, the controller or a section thereof performs the query with the index. In at least some embodiments, the controller performs a query, according to the determined search depth parameter value, with the index having the fixed build parameter values. In at least some embodiments, the controller causes the database hosting the index to perform the query.

At S666, the controller or a section thereof transmits the result content of the query. In at least some embodiments, the controller transmits the result content of the query to the client terminal through the network. In at least some embodiments, the controller causes the database hosting the index to transmit the result content of the query to the client terminal.

Figure 7:
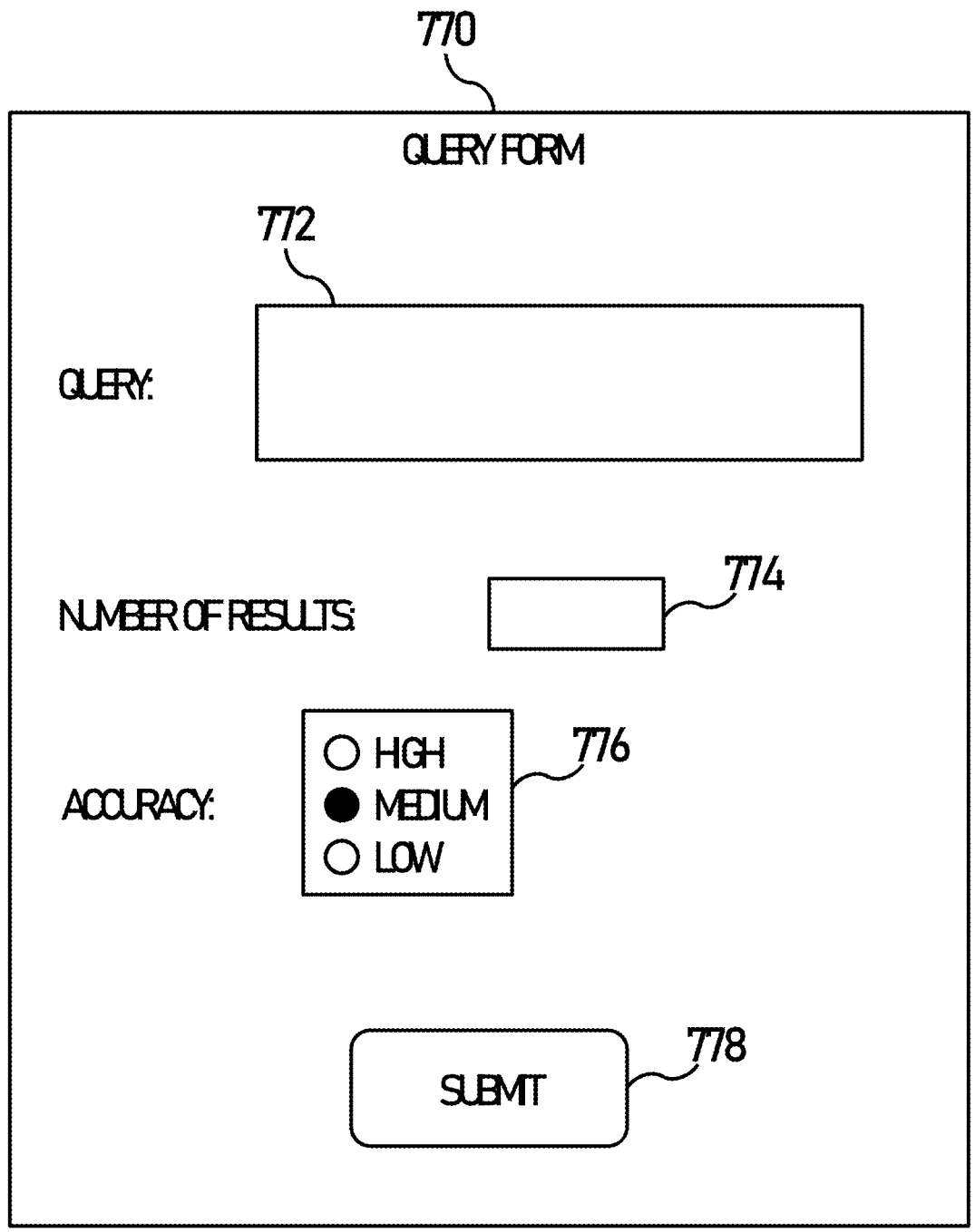
FIG. 7 is a user interface for a query form, according to at least some embodiments of the subject disclosure.

FIG. 7 is a user interface for a query form, according to at least some embodiments of the subject disclosure. In at least some embodiments, the user submits, through a client terminal, such as client terminal 110 of FIG. 1, a query by completing query form 770 and submitting the form to the apparatus through the network. Query form 770 includes text box 772, text box 774, checkbox 776, and submit button 778. In at least some embodiments, the user may enter a query in text box 772. In at least some embodiments, the user may enter a desired number of query results in text box 774. In at least some embodiments, the user may select a desired accuracy level of the query results in checkbox 776, e.g., high, medium and low. In at least some embodiments, the user submits the query request to the apparatus by clicking submit button 778 after the user completes query form 770.

Figure 8:
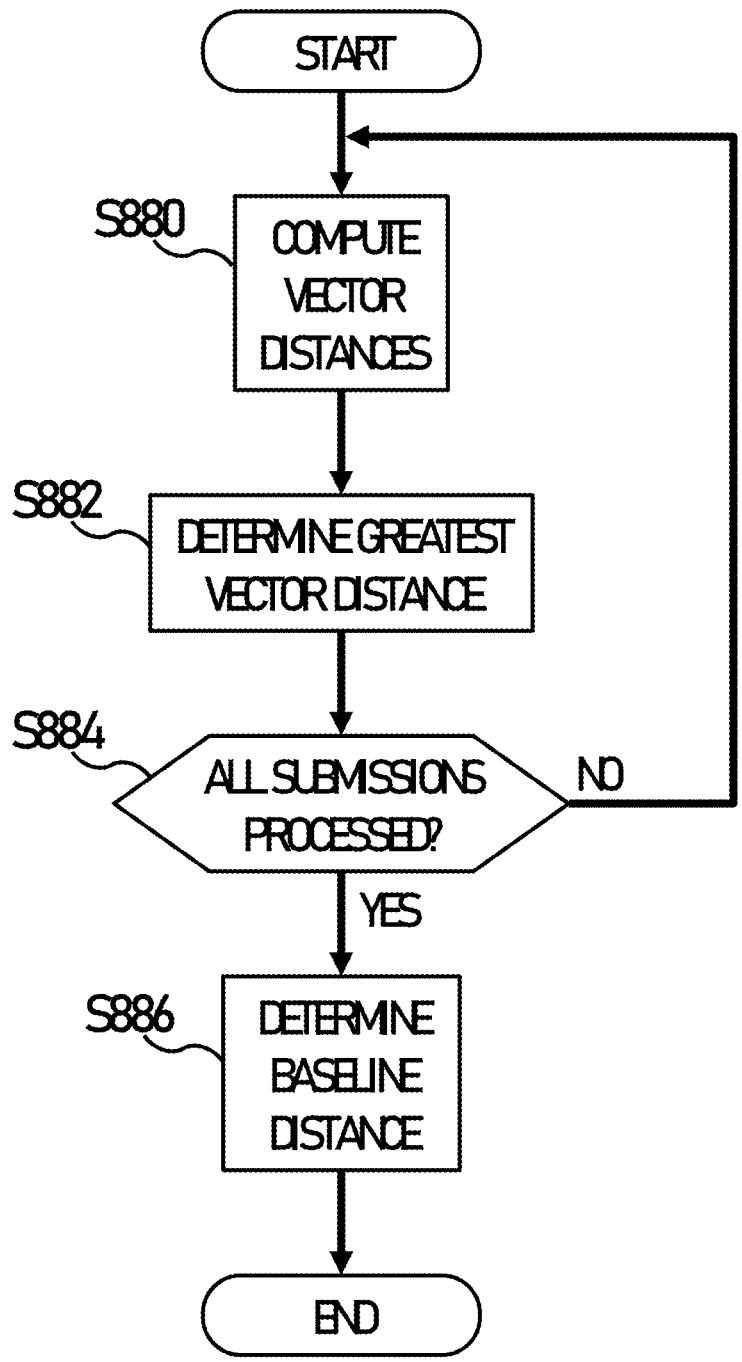
FIG. 8 is an operational flow for obtaining vector distances, according to at least some embodiments of the subject disclosure.

FIG. 8 is an operational flow for obtaining vector distances, according to at least some embodiments of the subject disclosure. The operational flow provides a method for determining a baseline distance based on vector distances. In at least some embodiments, one or more operations of the method are executed by the obtaining section of the controller, such as the obtaining section shown in FIG. 10, which will be explained hereinafter.

At S880, the obtaining section or a sub-section thereof computes vector distances. In at least some embodiments, as iterations of the operation at S880 proceed, the obtaining section computes, for each submission of the vector queries, a vector distance between at least one result vector of the result content and the submitted vector query. In at least some embodiments, the result content is obtained by the submitting section submitting each vector query in a vector query set according to the candidate search parameter values from each search parameter group, such as operations shown in FIG. 3, which is explained hereinabove. In at least some embodiments, the generating section is configured to generate the search parameter groups, such as operations shown in FIG. 3, which is explained hereinabove.

At S882, the obtaining section or a sub-section thereof determines a greatest vector distance. In at least some embodiments, as iterations of the operation at S882 proceed, the obtaining section determines, for each submission, a greatest vector distance among vector distances between each result vector of the result content and the submitted vector query.

At S884, the obtaining section determines whether all submissions are processed. In response to the obtaining section determining all submissions are processed, the operational flow proceeds to baseline distance determination at S886. In response to the obtaining section determining that unprocessed submissions remain, the operational flow returns to vector distances computation at S880.

At S886, the obtaining section or a sub-section thereof determines a baseline distance. In at least some embodiments, the obtaining section determines a baseline vector distance. In at least some embodiments, the baseline vector distance is equal to a smallest value among greatest vector distances determined for each submission. In at least some embodiments, the obtaining section selects a baseline submission as the at least one other submission, wherein a baseline vector distance is equal to the greatest vector distance of the baseline submission. In at least some embodiments, the obtaining section selects a parameter group $p_k$ from P as the baseline parameters $p_{baseline}$. In at least some embodiments, the selection method can be customizable. In at least some embodiments, the obtaining section uses the searched nearest neighbor result under the $p_{baseline}$ parameter as the baseline result $res_{baseline}$ to replace the standard nearest neighbor results in ground truth. In at least some embodiments, the determining section calculates the average relative accuracy with different test cases as the accuracy performance, wherein $$\text{precision}_i = \sum\nolimits_{j}^{m} \text{relative\_precision}_{i\_j}/m.$$

In at least some embodiments, the determining section analyzes the correlation between the parameters, query time and accuracy, and plots a chart for decision-making.

Figure 9:
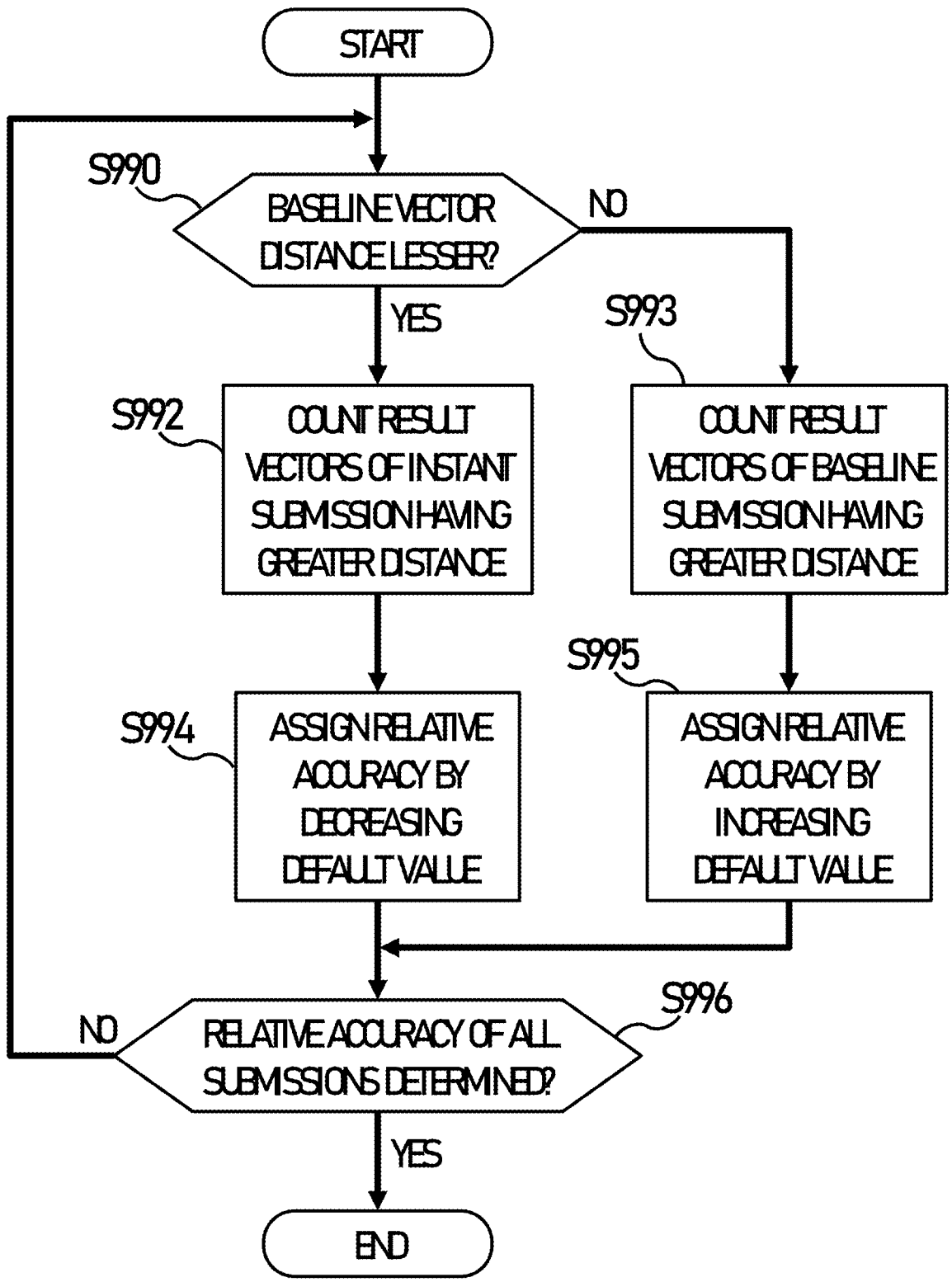
FIG. 9 is an operational flow for relative accuracy determination, according to at least some embodiments of the subject disclosure.

FIG. 9 is an operational flow for relative accuracy determination, according to at least some embodiments of the subject disclosure. The operational flow provides a method for determination of a relative accuracy of the results. In at least some embodiments, one or more operations of the method are executed by a determining section of the controller, such as the determining section shown in FIG. 10, which will be explained hereinafter.

At S990, the determining section or a sub-section thereof determines whether a baseline vector distance is lesser. In at least some embodiments, the controller determines whether the baseline vector distance is lesser than the greatest vector distance of the instant submission. In at least some embodiments, the max distance from vector query is defined as the threshold of the "topk" nearest neighbor results, wherein threshold=$dis_k$.

In at least some embodiments, a partial order relationship between the nearest neighbor results is constructed according to the threshold. In response to the baseline vector distance being lesser than the greatest vector distance of the instant submission, the operational flow proceeds to counting the result vectors of an instant submission at S992. In response to the baseline vector distance being no lesser than the greatest vector distance of the instant submission, the operational flow proceeds to counting the result vectors of a baseline submission at S993.

At S992, the determining section or a sub-section thereof counts the result vectors of an instant submission having a greater distance. In at least some embodiments, as iterations of the operation at S992 proceed, the determining section counts, for each submission, a number of result vectors having a greater vector distance than a baseline vector distance. In response to the controller counting the result vectors of an instant submission having a greater distance, the operational flow proceeds to relative accuracy assignment by decreasing a default value at S994.

At S993, the determining section or a sub-section thereof counts the result vectors of a baseline submission having a greater distance.

In at least some embodiments, as iterations of the operations at S990, S992, and S993 proceed the determining section counts, for each submission, a number of result vectors, from among result vectors of the submission and the baseline submission, having a greater vector distance than a lesser of the greatest vector distance of the submission and the baseline vector distance. In at least some embodiments, for any search results $res_j$, the determining section calculates relative_recall$_j^{baseline}$ as the precision score. In at least some embodiments, when the selected baseline search result is a standard nearest neighbor result, relative_recall will be consistent with recall:

$$\text{relative\_recall}_j^{baseline} = \text{relative\_recall}_j^{groundtruth} = \text{recall}_j.$$

In response to the determining section counting the result vectors of a baseline submission having a greater distance, the operational flow proceeds to relative accuracy assignment by increasing a default value at S995.

At S994, the determining section or a sub-section thereof assigns a relative accuracy by decreasing a default value. In at least some embodiments, the determining section assigns the relative accuracy value for each submission by decreasing a default value by an amount proportional to the number in response to the baseline vector distance being lesser than the greatest vector distance of the submission. In response to the determining section assigning the relative accuracy by decreasing the default value, the operational flow proceeds to determination of whether the relative accuracy of all submissions are determined at S996.

At S995, the determining section or a sub-section thereof assigns a relative accuracy by increasing a default value. In at least some embodiments, the determining section assigns the relative accuracy value for each submission by increasing a default value by an amount proportional to the number in response to the greatest vector distance of the submission being lesser than the baseline vector distance. In response to the determining section assigning the relative accuracy by increasing the default value, the operational flow proceeds to determination of whether the relative accuracy of all submissions are determined at S996.

In at least some embodiments, as iterations of the operational flow of FIG. 9 proceed, the accuracy scores of $res_j$ in baseline $res_i$ is defined as:

$$\text{relative\_recall}_j^i =$$
$$\begin{cases} 1 - |dis > \text{threshold}_i, \, dis \in \text{res\_dis}_j|/k & \text{if threshold}_j > \text{threshold}_i \\ 1 + |dis > \text{threshold}_i, \, dis \in \text{res\_dis}_i|/k & \text{if threshold}_j < \text{threshold}_i \\ 1 & \text{if threshold}_j = \text{threshold}_i. \end{cases}$$

wherein when relative_recall$_j^i$>1, $res_j$ is better than $res_i$.

At S996, the determining section determines whether a relative accuracy of all submissions is determined. In response to the relative accuracy of all submissions being determined, the operational flow ends. In response to the relative accuracy of all submissions being not determined, the operational flow returns to determination of whether the baseline vector distance is lesser at S990.

Figure 10:
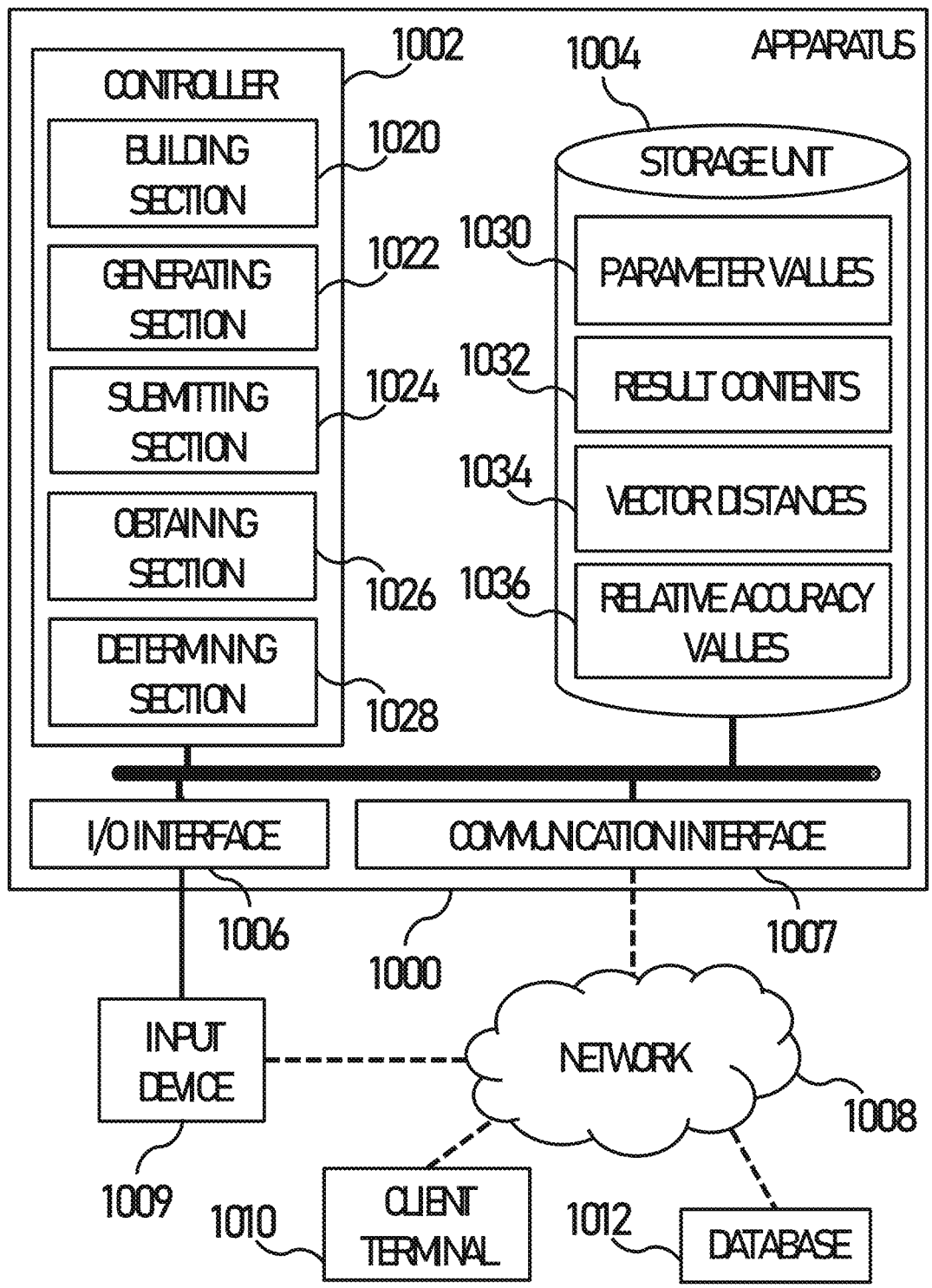
FIG. 10 is a block diagram of a hardware configuration for vector dataset index parameter determination, according to at least some embodiments of the subject disclosure.

FIG. 10 is a block diagram of a hardware configuration for vector dataset index parameter determination, according to at least some embodiments of the subject disclosure.

The exemplary hardware configuration includes apparatus 1000, which interacts with input device 1009, and communicates with input device 1009 through network 1008. In at least some embodiments, apparatus 1000 is a computer or other computing device that receives input or commands from input device 1009. In at least some embodiments, apparatus 1000 is integrated with input device 1009. In at least some embodiments, apparatus 1000 receives query requests from client terminal 1010 through network 1008. In at least some embodiments, apparatus 1000 retrieves vector data from database 1012. In at least some embodiments, apparatus 1000 is a computer system that executes computer-readable instructions to perform operations for vector dataset index parameter determination.

Apparatus 1000 includes a controller 1002, a storage unit 1004, an input/output interface 1006, and a communication interface 1007. In at least some embodiments, controller 1002 includes a processor or programmable circuitry executing instructions to cause the processor or programmable circuitry to perform operations according to the instructions. In at least some embodiments, controller 1002 includes analog or digital programmable circuitry, or any combination thereof. In at least some embodiments, controller 1002 includes physically separated storage or circuitry that interacts through communication. In at least some embodiments, storage unit 1004 includes a non-volatile computer-readable medium capable of storing executable and non-executable data for access by controller 1002 during execution of the instructions. Communication interface 1007 transmits and receives data from network 1008. Input/output interface 1006 connects to various input and output units, such as input device 1009, via a parallel port, a serial port, a keyboard port, a mouse port, a monitor port, and the like to accept commands and present information. In some embodiments, storage unit 1004 is external from apparatus 1000.

Controller 1002 includes building section 1020, generating section 1022, submitting section 1024, obtaining section 1026, and determining section 1028. Storage unit 1004 includes parameter values 1030, result contents 1032, vector distances 1034, and relative accuracy values 1036.

Building section 1020 is the circuitry or instructions of controller 1002 configured to build an index of a vector dataset. In at least some embodiments, building section 1020 is configured to build an index of a vector dataset according to each build parameter group among a plurality of build parameter groups, each build parameter group including a plurality of candidate build parameter values. In at least some embodiments, building section 1020 utilizes information in storage unit 1004, such as parameter values 1030. In at least some embodiments, building section 1020 includes sub-sections for performing additional functions, as described in the foregoing flow charts. In at least some embodiments, such sub-sections is referred to by a name associated with a corresponding function.

Generating section 1022 is the circuitry or instructions of controller 1002 configured to generate search parameter groups. In at least some embodiments, generating section 1022 is configured to generate search parameter groups, each search parameter group including a plurality of candidate search parameter values, wherein the plurality of candidate search parameter values includes a search depth parameter value and a number of requested results. In at least some embodiments, generating section 1022 utilizes information in storage unit 1004, such as parameter values 1030. In at least some embodiments, generating section 1022 includes sub-sections for performing additional functions, as described in the foregoing flow charts. In at least some embodiments, such sub-sections is referred to by a name associated with a corresponding function.

Submitting section 1024 is the circuitry or instructions of controller 1002 configured to submit vector queries to indexes. In at least some embodiments, submitting section 1024 is configured to submit each vector query in a vector query set to each index according to the candidate search parameter values from each search parameter group to obtain, for each submission, a result content and a result delay value. In at least some embodiments, submitting section 1024 utilizes information in storage unit 1004, such as parameter values 1030, and records information to storage unit 1004, such as result contents 1032. In at least some embodiments, submitting section 1024 includes sub-sections for performing additional functions, as described in the foregoing flow charts. In at least some embodiments, such sub-sections is referred to by a name associated with a corresponding function.

Obtaining section 1026 is the circuitry or instructions of controller 1002 configured to obtain vector distances. In at least some embodiments, obtaining section 1026 is configured to obtain, for each submission, a vector distance between at least one result vector of the result content and the submitted vector query. In at least some embodiments, obtaining section 1026 utilizes information from storage unit 1004, such as result contents 1032, and records information to storage unit 1004, such as vector distances 1034. In at least some embodiments, obtaining section 1026 includes sub-sections for performing additional functions, as described in the foregoing flow charts. In at least some embodiments, such sub-sections is referred to by a name associated with a corresponding function.

Determining section 1028 is the circuitry or instructions of controller 1002 configured to determine relative accuracy values. In at least some embodiments, determining section 1028 is configured to determine a relative accuracy value for each submission by comparing the vector distance of the result content to the vector distance of at least one other submission. In at least some embodiments, determining section 1028 utilizes information from storage unit 1004, such as result contents 1032 and vector distances 1034, and records information to storage unit 1004, such as relative accuracy values 1036. In at least some embodiments, determining section 1028 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

According to at least some embodiments of the subject disclosure, vector dataset index parameter determination is performed by building an index of a vector dataset according to each build parameter group among a plurality of build parameter groups, generating search parameter groups, submitting each vector query in a vector query set to each index according to the candidate search parameter values from each search parameter group to obtain, for each submission, a result content and a result delay value, obtaining, for each submission, a vector distance between at least one result vector of the result content and the submitted vector query, determining a relative accuracy value for each submission by comparing the vector distance of the result content to the vector distance of at least one other submission, correlating build parameter values and search parameter values with the relative accuracy values and the result delay values, and fixing build parameter values based on the correlating.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory computer-readable medium including instructions executable by a processor to cause the processor to perform operations comprising:
    building an index of a vector dataset according to each build parameter group among a plurality of build parameter groups, each build parameter group including a plurality of candidate build parameter values;
    generating search parameter groups, each search parameter group including a plurality of candidate search parameter values, wherein the plurality of candidate search parameter values includes a search depth parameter value and a number of requested results;
    submitting each vector query in a vector query set to each index according to the candidate search parameter values from each search parameter group to obtain, for each submission, a result content and a result delay value;
    obtaining, for each submission, a vector distance between at least one result vector of the result content and the submitted vector query;
    determining a relative accuracy value for each submission by comparing the vector distance of the result content to the vector distance of at least one other submission;
    correlating build parameter values and search parameter values with the relative accuracy values and the result delay values; and
    fixing build parameter values based on the correlating.

2. The non-transitory computer-readable medium of claim 1, wherein the obtaining further comprises:
  determining, for each submission, a greatest vector distance among vector distances between each result vector of the result content and the submitted vector query.

3. The non-transitory computer-readable medium of claim 2, wherein the determining further comprises:
  counting, for each submission, a number of result vectors having a greater vector distance than a baseline vector distance.

4. The non-transitory computer-readable medium of claim 3, wherein the baseline vector distance is equal to a smallest value among greatest vector distances determined for each submission.

5. The non-transitory computer-readable medium of claim 2, wherein
  the obtaining further comprises selecting a baseline submission as the at least one other submission, wherein a baseline vector distance is equal to the greatest vector distance of the baseline submission, and
  the determining further comprises counting, for each submission, a number of result vectors, from among result vectors of the submission and the baseline submission, having a greater vector distance than a lesser of the greatest vector distance of the submission and the baseline vector distance.

6. The non-transitory computer-readable medium of claim 5, wherein the determining further comprises
  assigning the relative accuracy value for each submission by increasing a default value by an amount proportional to the number in response to the greatest vector distance of the submission being lesser than the baseline vector distance, and
  assigning the relative accuracy value for each submission by decreasing a default value by an amount proportional to the number in response to the baseline vector distance being lesser than the greatest vector distance of the submission.

7. The non-transitory computer-readable medium of claim 1, wherein the operations further comprise:
  deploying the index for the vector dataset built according to the fixed build parameter values.

8. The non-transitory computer-readable medium of claim 7, wherein the operations further comprise:
  determining a mathematical relationship expressing a correlation of the search depth parameter values, the numbers of requested results, and the accuracy values obtained in response to vector queries submitted to the index having the fixed build parameter values;
  determining a search depth parameter value based on a target accuracy and a target number of results based on the mathematical relationship;
  performing a query, according to the determined search depth parameter value, with the index having the fixed build parameter values; and
  transmitting a result content of the query.

9. The non-transitory computer-readable medium of claim 1, wherein the operations further comprise:
  determining the plurality of candidate build parameter values of each build parameter group based on an index type.

10. A method comprising:
  building an index of a vector dataset according to each build parameter group among a plurality of build parameter groups, each build parameter group including a plurality of candidate build parameter values;
  generating search parameter groups, each search parameter group including a plurality of candidate search parameter values, wherein the plurality of candidate search parameter values includes a search depth parameter value and a number of requested results;
  submitting each vector query in a vector query set to each index according to the candidate search parameter values from each search parameter group to obtain, for each submission, a result content and a result delay value;
  obtaining, for each submission, a vector distance between at least one result vector of the result content and the submitted vector query;
  determining a relative accuracy value for each submission by comparing the vector distance of the result content to the vector distance of at least one other submission;
  correlating build parameter values and search parameter values with the relative accuracy values and the result delay values; and
  fixing build parameter values based on the correlating.

11. The method of claim 10, wherein the obtaining further comprises:
  determining, for each submission, a greatest vector distance among vector distances between each result vector of the result content and the submitted vector query.

12. The method of claim 11, wherein the determining further comprises:
  counting, for each submission, a number of result vectors having a greater vector distance than a baseline vector distance.

13. The method of claim 12, wherein the baseline vector distance is equal to a smallest value among greatest vector distances determined for each submission.

14. The method of claim 11, wherein
  the obtaining further comprises selecting a baseline submission as the at least one other submission, wherein a baseline vector distance is equal to the greatest vector distance of the baseline submission, and
  the determining further comprises counting, for each submission, a number of result vectors, from among result vectors of the submission and the baseline submission, having a greater vector distance than a lesser of the greatest vector distance of the submission and the baseline vector distance.

15. The method of claim 14, wherein the determining further comprises
  assigning the relative accuracy value for each submission by increasing a default value by an amount proportional to the number in response to the greatest vector distance of the submission being lesser than the baseline vector distance, and
  assigning the relative accuracy value for each submission by decreasing a default value by an amount proportional to the number in response to the baseline vector distance being lesser than the greatest vector distance of the submission.

16. The method of claim 10, further comprising:
  deploying the index for the vector dataset built according to the fixed build parameter values.

17. The method of claim 16, further comprising:
  determining a mathematical relationship expressing a correlation of the search depth parameter values, the numbers of requested results, and the accuracy values obtained in response to vector queries submitted to the index having the fixed build parameter values;

determining a search depth parameter value based on a target accuracy and a target number of results based on the mathematical relationship;

performing a query, according to the determined search depth parameter value, with the index having the fixed build parameter values; and transmitting a result content of the query.

18. The method of claim 10, further comprising:

determining the plurality of candidate build parameter values of each build parameter group based on an index type.

19. An apparatus comprising:

a controller comprising circuitry configured to build an index of a vector dataset according to each build parameter group among a plurality of build parameter groups, each build parameter group including a plurality of candidate build parameter values;

generate search parameter groups, each search parameter group including a plurality of candidate search parameter values, wherein the plurality of candidate search parameter values includes a search depth parameter value and a number of requested results;

submit each vector query in a vector query set to each index according to the candidate search parameter values from each search parameter group to obtain, for each submission, a result content and a result delay value;

obtain, for each submission, a vector distance between at least one result vector of the result content and the submitted vector query;

determine a relative accuracy value for each submission by comparing the vector distance of the result content to the vector distance of at least one other submission;

correlate build parameter values and search parameter values with the relative accuracy values and the result delay values; and fix build parameter values based on the correlating.

20. The apparatus of claim 19, wherein the circuitry configured to obtain is further configured to:

determine, for each submission, a greatest vector distance among vector distances between each result vector of the result content and the submitted vector query.

* * * * *